US012800986B2

(12) United States Patent
Wu et al.

(10) Patent No.: US 12,800,986 B2
(45) Date of Patent: Nov. 17, 2026

(54) OPTICAL ELEMENT DRIVING MECHANISM

(71) Applicant: Actutek Corporation, Taoyuan City (TW)

(72) Inventors: Chia-Che Wu, Taoyuan City (TW); Chao-Chang Hu, Taoyuan City (TW); Yu-Chiao Lo, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 283 days.

(21) Appl. No.: 18/496,829

(22) Filed: Oct. 27, 2023

(65) Prior Publication Data

US 2024/0142855 A1 May 2, 2024

Related U.S. Application Data

(60) Provisional application No. 63/420,236, filed on Oct. 28, 2022.

(51) Int. Cl.
*G03B 5/00* (2021.01)
*G02B 3/14* (2006.01)
(Continued)

(52) U.S. Cl.
CPC ................. *G03B 5/00* (2013.01); *G02B 3/14* (2013.01); *G02B 7/08* (2013.01); *G02B 27/646* (2013.01);
(Continued)

(58) Field of Classification Search
CPC ...... G02B 27/646; G02B 6/3514; G02B 7/08; G02B 7/09; G02B 7/182; G02B 15/173; G02B 15/14; G02B 15/177; G02B 15/22; G02B 15/16; G02B 13/18; G02B 13/009; G02B 27/64; G02B 13/02; G02B 7/04; G02B 13/0015; G02B 15/15; G02B 13/0045; G02B 15/17; G02B 15/20; G02B 27/0025; G02B 9/62; G02B 13/04; G02B 7/023; G02B 9/64; G02B 13/001; G02B 13/0065; G02B 15/10; G02B 15/163; G02B 15/167; G02B 23/02; G02B 7/02; G02B 7/022; G02B 7/102; G02B 7/14; G02B 9/04; G02B 9/34; G02B 9/60; G02B 13/002; G02B 13/004; G02B 13/06; G02B 13/16; G02B 15/12; G02B 15/161; G02B 17/08; G02B 17/0804; G02B 17/0808; G02B 17/0896; G02B 21/26; G02B 23/08;
(Continued)

(56) References Cited

U.S. PATENT DOCUMENTS

2021/0302690 A1* 9/2021 Lin .......................... G02B 7/09

* cited by examiner

*Primary Examiner* — Stephone B Allen
*Assistant Examiner* — Tamara Y. Washington
(74) *Attorney, Agent, or Firm* — MUNCY, GEISSLER, OLDS & LOWE, P.C.

(57) ABSTRACT

An optical element driving mechanism is for accommodating a first optical element and includes a fixed assembly, a movable assembly and a driving assembly. The movable assembly is configured to connect a second optical element, the second optical element corresponds to the first optical element, and the movable assembly is movable relative to the fixed assembly. The driving assembly is configured to drive the movable assembly to move relative to the fixed assembly. The fixed assembly includes a first accommodation space configured to accommodate the first optical element.

19 Claims, 11 Drawing Sheets

(51) Int. Cl.
*G02B 7/08* (2021.01)
*G02B 27/64* (2006.01)
*G03B 13/36* (2021.01)

(52) U.S. Cl.
CPC ...... *G03B 13/36* (2013.01); *G03B 2205/0069* (2013.01)

(58) Field of Classification Search
CPC .............. G02B 26/004; G02B 26/0808; G02B 26/0816; G02B 27/0911; G02B 27/644; G02B 3/14; G02B 7/021; G02B 7/025; G02B 7/18; G02B 7/24; G02B 7/28; G02B 9/00; G02B 9/24; H04N 5/23287; H04N 5/2252; H04N 5/2254; H04N 5/2329; H04N 5/2257; H04N 5/2253; H04N 5/23248; H04N 5/2328; H04N 5/225; H04N 5/232; H04N 5/23209; H04N 5/23212; H04N 5/23245; H04N 5/23258; H04N 5/23264; H04N 13/0203; H04N 13/0239; H04N 13/0296; H04N 5/222; H04N 5/228; H04N 5/23229; H04N 5/23251; H04N 5/23254; H04N 5/23261; H04N 5/23274; H04N 5/238; H04N 23/58; H04N 23/687; H04N 23/55; G03B 5/00; G03B 3/00; G03B 3/14; G03B 5/02; G03B 5/06; G03B 2205/0015; G03B 3/10; G03B 2205/0069; G03B 2205/002; G03B 2205/0007; G03B 13/36; G03B 17/02; G03B 17/04; G03B 17/14; G03B 17/12; G03B 2205/0046; G03B 2205/0053; G03B 2205/0092; H02K 41/0356

See application file for complete search history.

OPTICAL ELEMENT DRIVING MECHANISM

CROSS REFERENCE TO RELATED APPLICATIONS

This application claims the benefit of U.S. Provisional Application No. 63/420,236, filed Oct. 28, 2022, the entirety of which is incorporated by reference herein.

BACKGROUND OF THE INVENTION

Field of the Disclosure

The present disclosure relates to an optical element driving mechanism, and in particular it relates to an optical element driving mechanism with a long focal length and anti-shake functionality.

Description of the Related Art

As technology has developed, many of today's electronic devices (such as smartphones) have a camera and video-recording functionality. Using the camera modules disposed in electronic devices, users can operate their electronic devices to capture photographs and record videos.

Today's design of electronic devices continues to follow the trend of miniaturization, meaning that the various components of the camera module and its structure must also be continuously reduced in size, so as to achieve miniaturization. In general, the driving mechanism in a camera module has a camera lens holder configured to hold a camera lens, and the driving mechanism can perform the functions of auto focusing and optical image stabilization. However, although existing driving mechanisms can achieve the aforementioned functions needing in photography and video recording, they still cannot meet all the needs of users.

Therefore, how to design a camera module capable of performing autofocus, optical anti-shake functions and achieving miniaturization at the same time are topics nowadays that need to be discussed and solved.

BRIEF SUMMARY OF THE INVENTION

Accordingly, one objective of the present disclosure is to provide an optical element driving mechanism to solve the above problems.

According to some embodiments of the disclosure, an optical element driving mechanism is provided for accommodating a first optical element and including a fixed assembly, a movable part and a driving assembly. The movable part is configured to connect a second optical element, the second optical element corresponds to the first optical element, and the movable part is movable relative to the fixed assembly. The driving assembly is configured to drive the movable part to move relative to the fixed assembly. The fixed assembly includes a first accommodation space configured to accommodate the first optical element.

According to some embodiments, the movable assembly includes a second accommodation space configured to accommodate the first optical element. The second accommodation space is located in the first accommodation space. The second optical element defines an optical axis. The optical axis passes through the second optical element and the first optical element. The movable assembly includes a first movable part and a second movable part. A portion of the first movable part is accommodated in the second movable part. When viewed along the optical axis, the first movable part overlaps a portion of the second movable part. When viewed along a first axis, the first movable part overlaps a portion of the second movable part. The first axis is not parallel to the optical axis. The first movable part includes a first side portion and a second side portion. When viewed along the optical axis, the first side portion and the second side portion are separated from each other and located on opposite sides of the first optical element. When viewed along the optical axis, the second movable part has a long strip-shaped structure.

According to some embodiments, the movable assembly further includes a first opening. The first opening corresponds to the first optical element. When viewed along the first axis, at least a portion of the first optical element is exposed from the first opening. The first side portion and the second side portion respectively have a first right top wall and a first left top wall, corresponding to the second optical element. The second movable part has a second top wall corresponding to the second optical element. When viewed along the optical axis, the first left top wall, the first right top wall and the second top wall form a second opening. The optical axis passes through the second opening. When viewed along the optical axis, a portion of the first optical element is exposed from the second opening.

According to some embodiments, the first side portion and the second side portion further have a first right side wall and a first left side wall respectively. When viewed along the optical axis, the first left side wall and the first right side wall are located on opposite sides of the first optical element. The second movable part further includes a first side wall, a second side wall and a rear side wall. The rear side wall is connected between the first side wall and the second side wall. The second top wall is connected between the first side wall and the second side wall.

According to some embodiments, when viewed along the optical axis, the first side wall and the second side wall are located on opposite sides of the first optical element. When viewed along the optical axis, the first optical element is located between the first side wall and the second side wall. The second top wall, the first side wall, the second side wall and the rear side wall form the aforementioned first opening. When viewed along the first axis, the second movable part surrounds the first optical element.

According to some embodiments, the second movable part has a front penetrating hole which is formed on the second top wall. The first left top wall and the first right top wall are located within the front penetrating hole. When viewed along the optical axis, the first left top wall and the first right top wall do not overlap the second top wall. When viewed along the first axis, the first left top wall and the first right top wall overlap the second top wall. The first side wall and the second side wall respectively form a first penetrating hole and a second penetrating hole. A portion of the first right side wall is located within the first penetrating hole, and a portion of the first left side wall is located within the second penetrating hole. When viewed along the first axis, a portion of the first right top wall does not overlap the first side wall. When viewed along the first axis, a portion of the first left top wall does not overlap the second side wall.

According to some embodiments, the fixed assembly further includes a base and an outer frame. The base includes a base plate having a plate-shaped structure. The outer frame is fixedly connected to the base and forms the first accommodation space. The fixed assembly further includes a first supporting portion which is disposed on the base plate to accommodate the first optical element. The first optical element is fixedly connected to the first supporting portion of the fixed assembly. The movable assembly is movable relative to the first optical element. The first surface of the first side wall faces the first optical element. The second surface of the first side wall and the first surface face in opposite directions. There is a gap between the first surface and the fixed assembly. There is another gap between the second surface and the fixed assembly. The third surface of the second side wall faces the first optical element. A fourth surface of the second side wall and the third surface face in opposite directions. There is another gap between the third surface and the fixed assembly. There is another gap between the fourth surface and the fixed assembly. The third surface faces the first surface.

According to some embodiments, the fixed assembly further includes a third opening. The third opening corresponds to the second optical element. The third opening corresponds to the first optical element. When viewed along the optical axis, the third opening is larger than the second opening. The outer frame has a first outer wall and a second outer wall. The first outer wall and the second outer wall each have a plate-shaped structure. The third opening is formed by the first outer wall and the second outer wall. The first outer wall and the second outer wall are perpendicular to each other. An external light is incident on the third opening in a first direction and is emitted in a second direction from the third opening. The first direction is not parallel to the second direction. The first direction is parallel to the first axis. The fixed assembly further includes a fourth opening corresponding to the second optical element. When viewed along the first axis, the third opening overlaps at least a portion of the fourth opening. The fourth opening is located at the base.

According to some embodiments, the optical element driving mechanism further includes a connecting assembly, so that the movable assembly is movably connected to the fixed assembly through the connecting assembly. The connecting assembly includes a first elastic member and a second elastic member. The first elastic member and the second elastic member respectively have a first flexible portion and a second flexible portion. The first flexible portion has flexibility. The second flexible portion has flexibility. When viewed along the optical axis, the first flexible portion and the first optical element are arranged along a second axis. The second axis is not parallel to the first axis. When viewed along the optical axis, the first flexible portion and the second flexible portion are arranged along the second axis. When viewed along the optical axis, the center of the second optical element is located between the first flexible portion and the second flexible portion.

According to some embodiments, the first elastic member has a first connecting end which is fixedly connected to the fixed assembly. The first connecting end is affixed to a first setting portion of the fixed assembly. The first elastic member further has a second connecting end which is fixedly connected to the first movable part. The first flexible portion is connected between the first connecting end and the second connecting end. The second elastic member has a third connecting end which is fixedly connected to the fixed assembly. The third connecting end is affixed to a second setting portion of the fixed assembly. The second elastic member further has a fourth connecting end which is fixedly connected to the first movable part. The second flexible portion is connected between the third connecting end and the fourth connecting end.

According to some embodiments, when viewed along the optical axis, the first setting portion, the second optical element and the second setting portion are arranged along the second axis. The first setting portion and the second setting portion each have a columnar structure extending along the first axis from the base plate of the base. A first avoidance portion of the first movable part corresponds to the first setting portion. A second avoidance portion of the first movable part corresponds to the second setting portion. The first avoidance portion and the second avoidance portion have recessed structures.

According to some embodiments, the connecting assembly further includes a third elastic member and a fourth elastic member. The third elastic member and the fourth elastic member respectively have a third flexible portion and a fourth flexible portion. The third flexible portion is flexible. The fourth flexible portion is flexible. When viewed along the optical axis, the third flexible portion and the first optical element are arranged along the second axis. When viewed along the optical axis, the third flexible portion and the fourth flexible portion are arranged along the second axis. When viewed along the optical axis, the center of the second optical element is located between the third flexible portion and the fourth flexible portion. When viewed along the optical axis, the third flexible portion overlaps a portion of the first flexible portion. When viewed along the optical axis, the fourth flexible portion overlaps a portion of the second flexible portion. When viewed along the second axis, the first elastic member does not overlap the third elastic member. When viewed along the second axis, the second elastic member does not overlap the fourth elastic member.

According to some embodiments, the third elastic member has a fifth connecting end which is fixedly connected to the fixed assembly. The fifth connecting end is affixed to the first setting portion. The third elastic member further has a sixth connecting end which is fixedly connected to the second movable part. The third flexible portion is connected between the fifth connecting end and the sixth connecting end. The fourth elastic member further has a seventh connecting end which is fixedly connected to the fixed assembly. The seventh connecting end is affixed to the second setting portion. The fourth elastic member further has an eighth connecting end which is fixedly connected to the second movable part. The fourth flexible portion is connected between the seventh connecting end and the eighth connecting end. When viewed along the optical axis, the fifth connecting end does not overlap the first connecting end. When viewed along the optical axis, the seventh connecting end does not overlap the third connecting end. When viewed along the optical axis, the optical element driving mechanism does not include any flexible portion arranged with the second optical element along the first axis.

According to some embodiments, the fifth connecting end includes a first outer side connecting portion and a second outer side connecting portion. The first outer side connecting portion and the second outer side connecting portion are fixedly connected to the first setting portion. When viewed along the optical axis, the first outer side connecting portion and the second outer side connecting portion do not overlap the first connecting end. The sixth connecting end includes a first inner side connecting portion and a second inner side connecting portion. The first inner side connecting portion and the second inner side connecting portion are fixedly connected to the second movable part. When viewed along the optical axis, the first inner side connecting portion and the second inner side connecting portion do not overlap the second connecting end.

According to some embodiments, the seventh connecting end includes a third outer side connecting portion and a fourth outer side connecting portion. The third outer side connecting portion and the fourth outer side connecting portion are fixedly connected to the second setting portion. When viewed along the optical axis, the third outer side connecting portion and the fourth outer side connecting portion do not overlap the third connecting end. The eighth connecting end includes a third inner side connecting portion and a fourth inner side connecting portion. The third inner side connecting portion and the fourth inner side connecting portion are fixedly connected to the second movable part. When viewed along the optical axis, the third inner side connecting portion and the fourth inner side connecting portion do not overlap the fourth connecting end.

According to some embodiments, the first optical element and the second optical element are made of different materials. The first optical element and the second optical element have different material states. The second optical element is a liquid lens. The first optical element includes a solid lens. The second optical element includes an optical fixed portion, a main body and a pushing portion. The optical fixed portion is fixedly connected to the fixed assembly. The optical fixed portion is affixed to the fixed assembly by laser welding. The optical axis passes through the main body. The pushing portion is fixedly connected to the movable assembly. The pushing portion has a ring-shaped structure. When viewed along the optical axis, the optical fixed portion overlaps at least a portion of the connecting assembly.

According to some embodiments, the first right side wall and the first left side wall respectively form a first accommodation hole and a second accommodation hole. The driving assembly includes a first driving element and a second driving element, which are respectively disposed in the first accommodation hole and the second accommodation hole. The first driving element and the second driving element are configured to drive the first movable part to rotate around a first rotation axis, so that the pushing portion pushes the main body to change the optical properties of the second optical element. When viewed along the optical axis, the first rotation axis is located between the first flexible portion and the second flexible portion. When viewed along the second axis, a first gap is formed between the first right side wall and the first side wall along the first axis. When viewed along the second axis, a second gap is formed between the first right side wall and the rear side wall along the optical axis. The second gap is larger than the first gap. When the first movable part rotates around the first rotation axis, the first movable part is not in contact with the second movable part. When viewed along the second axis, a third gap is formed between the rear side wall and the base along the first axis. When viewed along the second axis, a fourth gap is formed between the rear side wall and the outer frame along the optical axis. A rear penetrating hole is formed on the rear side wall.

According to some embodiments, the driving assembly further includes a third driving element disposed in the rear penetrating hole. The third driving element is configured to drive the second movable part to rotate around a second rotation axis, so that the pushing portion pushes the main body to change the optical properties of the second optical element. When the second movable part rotates around the second rotation axis, the second movable part is not in contact with the first movable part. When viewed along the optical axis, the second rotation axis passes through the third flexible portion and the fourth flexible portion. The second rotation axis is not parallel to the first rotation axis. The second rotation axis is perpendicular to the first rotation axis. The first rotation axis does not intersect with the second rotation axis. When viewed along the optical axis, the first rotation axis intersects with the optical axis. North-pole and South-pole of each of the first driving element and the second driving element are arranged along the optical axis. North-pole and South-pole of the third driving element are arranged along the first axis.

According to some embodiments, the driving assembly further includes a first coil and a second coil, corresponding to the first driving element and the second driving element respectively. The optical element driving mechanism further includes a circuit assembly which is fixedly disposed on the base of the fixed assembly. The circuit assembly includes a first circuit portion and a second circuit portion. The first coil and the second coil are respectively fixedly disposed on the first circuit portion and the second circuit portion. The driving assembly further includes a third coil corresponding to the third driving element. The circuit assembly further includes a third circuit portion which is connected between the first circuit portion and the second circuit portion. The third coil is fixedly disposed on the third circuit portion. The first circuit portion to the third circuit portion are fixedly disposed on the first supporting portion of the base.

According to some embodiments, when viewed along the first axis, the first coil is located between the first supporting portion and the movable assembly. When viewed along the first axis, the second coil is located between the first supporting portion and the movable assembly. When viewed along the first axis, the third coil is located between the first supporting portion and the movable assembly. When viewed along the first axis, the length of the third coil along the second axis is greater than the length of the third driving element along the second axis.

The present disclosure provides an optical element driving mechanism, which can be a periscope lens mechanism, including a fixed assembly, a driving assembly, a movable assembly and a connecting assembly. The movable assembly is movably connected to the base of the fixed assembly through the connecting assembly, and the movable assembly surrounds the first optical element. The optical fixed portion of the second optical element is affixed to the outer frame of the fixed assembly, and the pushing portion is fixedly connected to the movable assembly.

The driving assembly is configured to drive the movable assembly to move relative to the base and the first optical element to drive the pushing portion to push the thin film and the liquid, thereby changing the optical properties of the second optical element, so as to achieve the purpose of optical image stabilization and macro photography. Because there is a gap between the movable assembly and the base, the movable assembly does not collide with the base and cause damage when rotating.

It is worth noting that the movable assembly can include the first movable part and the second movable part. The first movable part is suspended on the base through the first elastic member and the second elastic member, and the second movable part is suspended on the base through the third elastic member and the fourth elastic member. The first movable part and the second movable part can rotate individually or cooperatively. Based on this design, the control accuracy of the optical properties of the second optical element can be improved.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
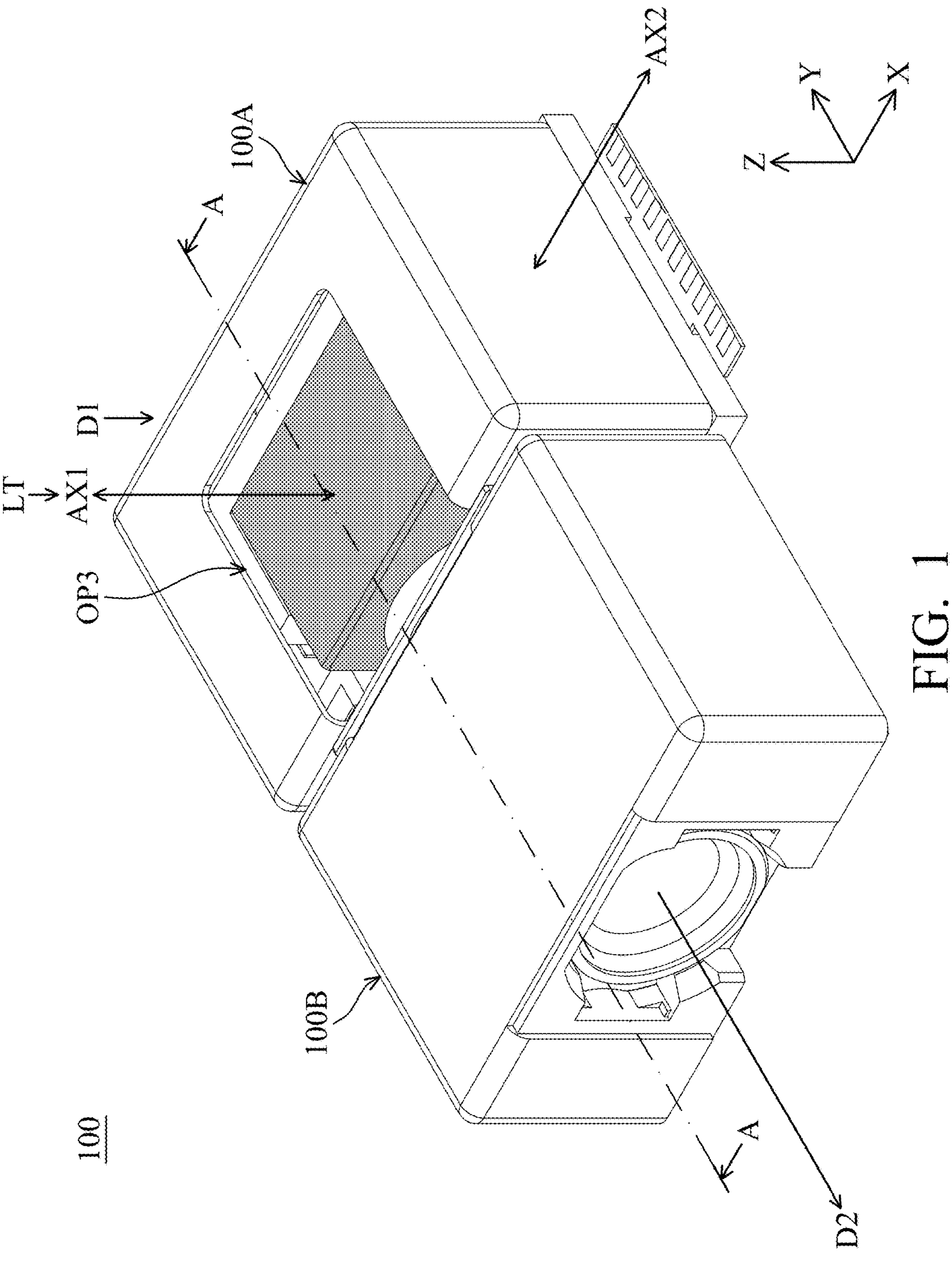
FIG. 1 is a schematic diagram of an optical element driving mechanism 100 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
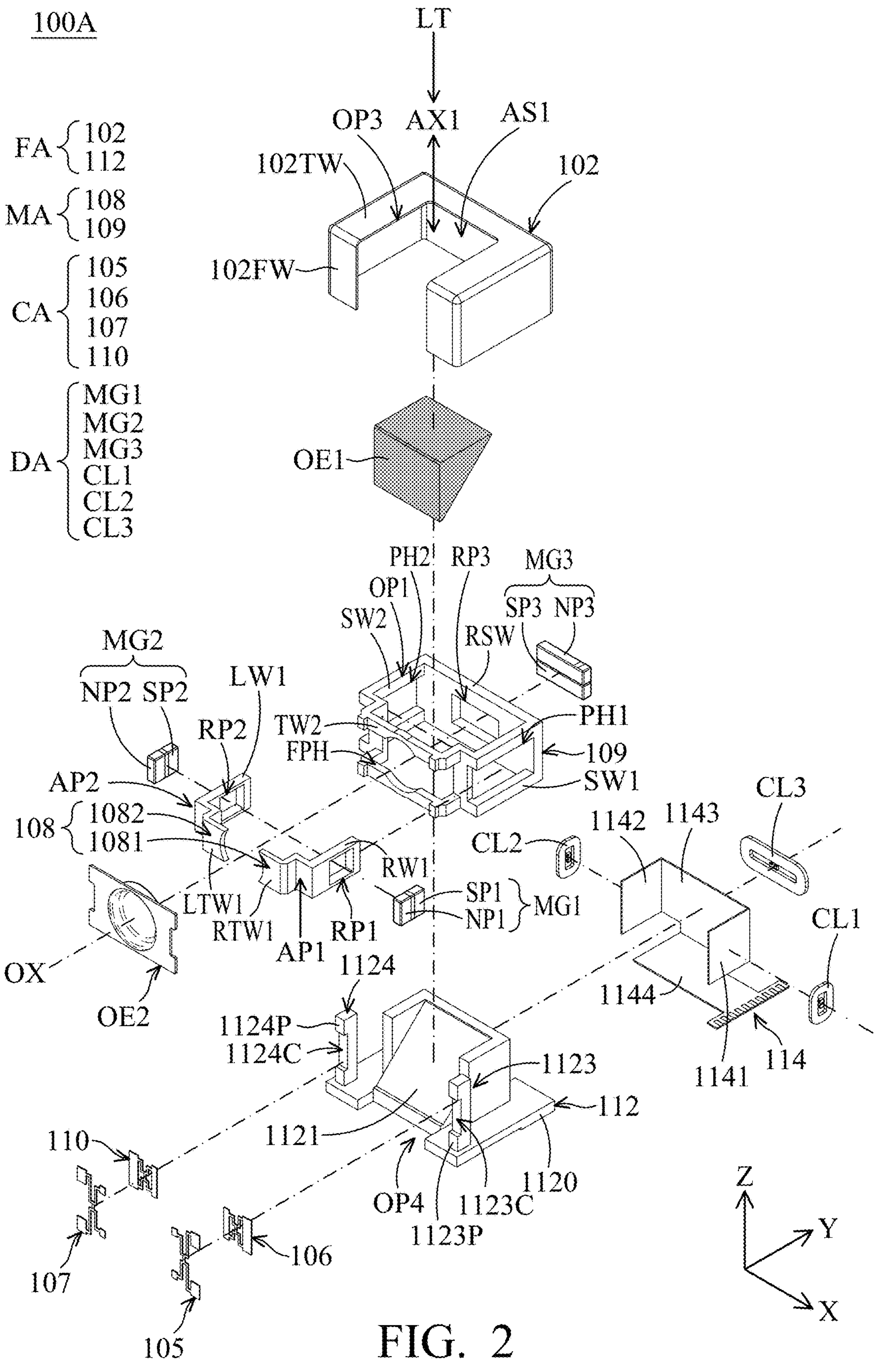
FIG. 2 is an exploded diagram of a partial structure of the optical element driving mechanism 100 according to an embodiment of the present disclosure.
Figure 3:
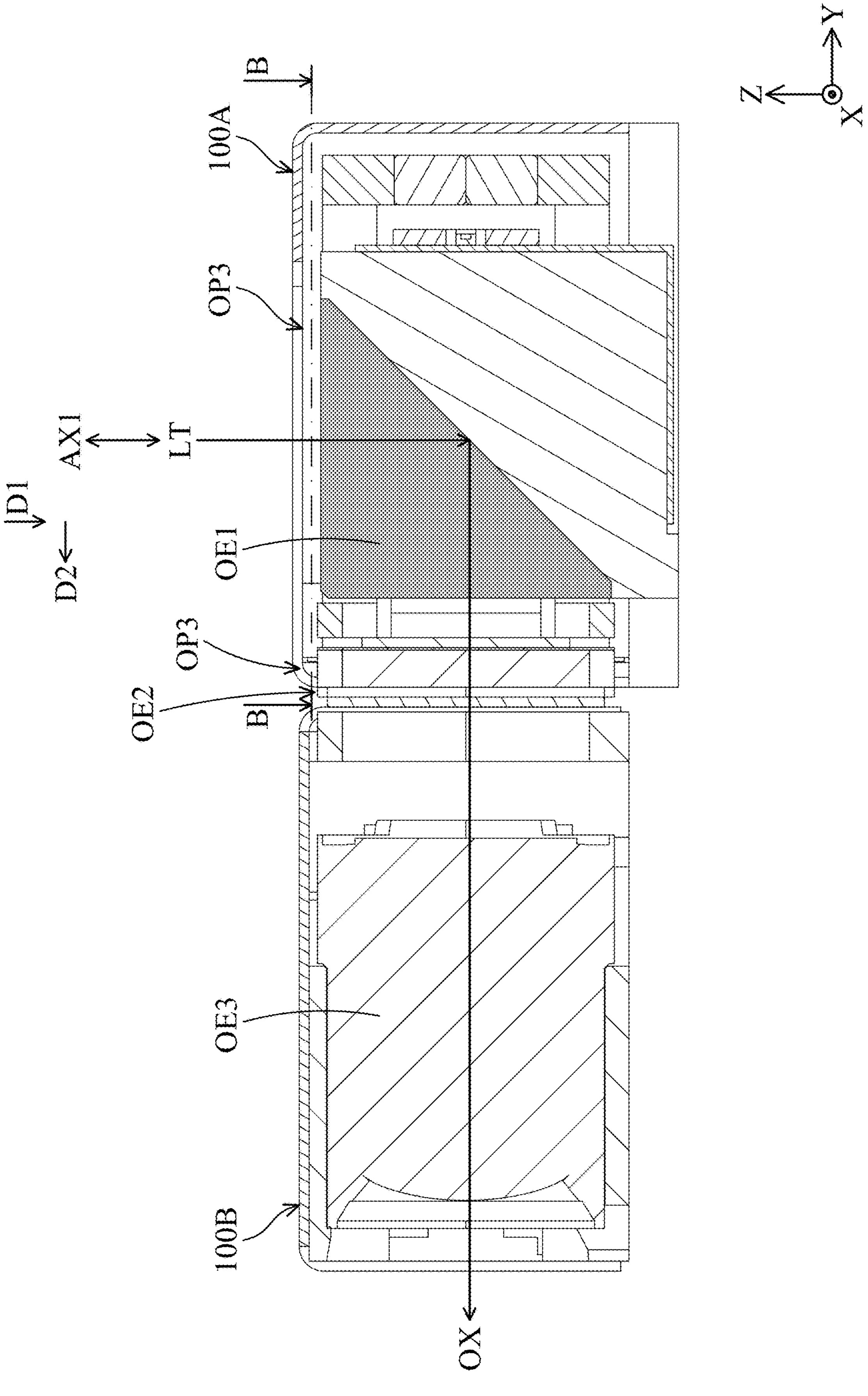
FIG. 3 is a cross-sectional view of the optical element driving mechanism 100 along line A-A in FIG. 1 according to an embodiment of the present disclosure.

Please refer to FIG. 1 to FIG. 3. FIG. 1 is a schematic diagram of an optical element driving mechanism 100 according to an embodiment of the present disclosure, FIG. 2 is an exploded diagram of a partial structure of the optical element driving mechanism 100 according to an embodiment of the present disclosure, and FIG. 3 is a cross-sectional view of the optical element driving mechanism 100 along line A-A in FIG. 1 according to an embodiment of the present disclosure. The optical element driving mechanism 100 can be an optical camera system and can be configured to hold and drive an optical element. The optical element driving mechanism 100 can be installed in various electronic devices or portable electronic devices, such as a smartphone, for allowing a user to perform the image capturing function. In this embodiment, the optical element driving mechanism 100 can be a voice coil motor (VCM) with an auto-focusing (AF) function, but it is not limited thereto. In other embodiments, the optical element driving mechanism 100 can also perform the functions of auto-focusing and optical image stabilization (OIS).

In this embodiment, the optical element driving mechanism 100 may include a first optical module 100A and a second optical module 100B. An external light LT enters the first optical module 100A along a first axis AX1 and is reflected by a first optical element OE1, then passes through a second optical element OE2 and is emitted from a third optical element OE3 of the second optical module 100B.

The first optical module 100A may have autofocus (AF) and/or optical image stabilization (OIS) functions, and the second optical module 100B may be a fixed lens, or may also have autofocus (AF) and/or optical image stabilization (OIS)

functions. In other words, the functions of the two optical modules can be selected and matched with each other according to actual needs.

As shown in FIG. 2, the first optical module 100A may include a fixed assembly FA, a movable assembly MA, and a driving assembly DA. The movable assembly MA is configured to be connected to the second optical element OE2. The second optical element OE2 corresponds to the first optical element OE1, and the movable assembly MA is movable relative to the fixed assembly FA. The driving assembly DA is configured to drive the movable assembly MA to move relative to the fixed assembly FA.

In this embodiment, as shown in FIG. 2, the fixed assembly FA includes an outer frame 102 and a base 112. The outer frame 102 is fixedly connected to the base 112 and forms a first accommodation space AS1 which is configured to accommodate the first optical element OE1. The first optical element OE1 may be a reflective prism, but it is not limited thereto.

Figure 4:
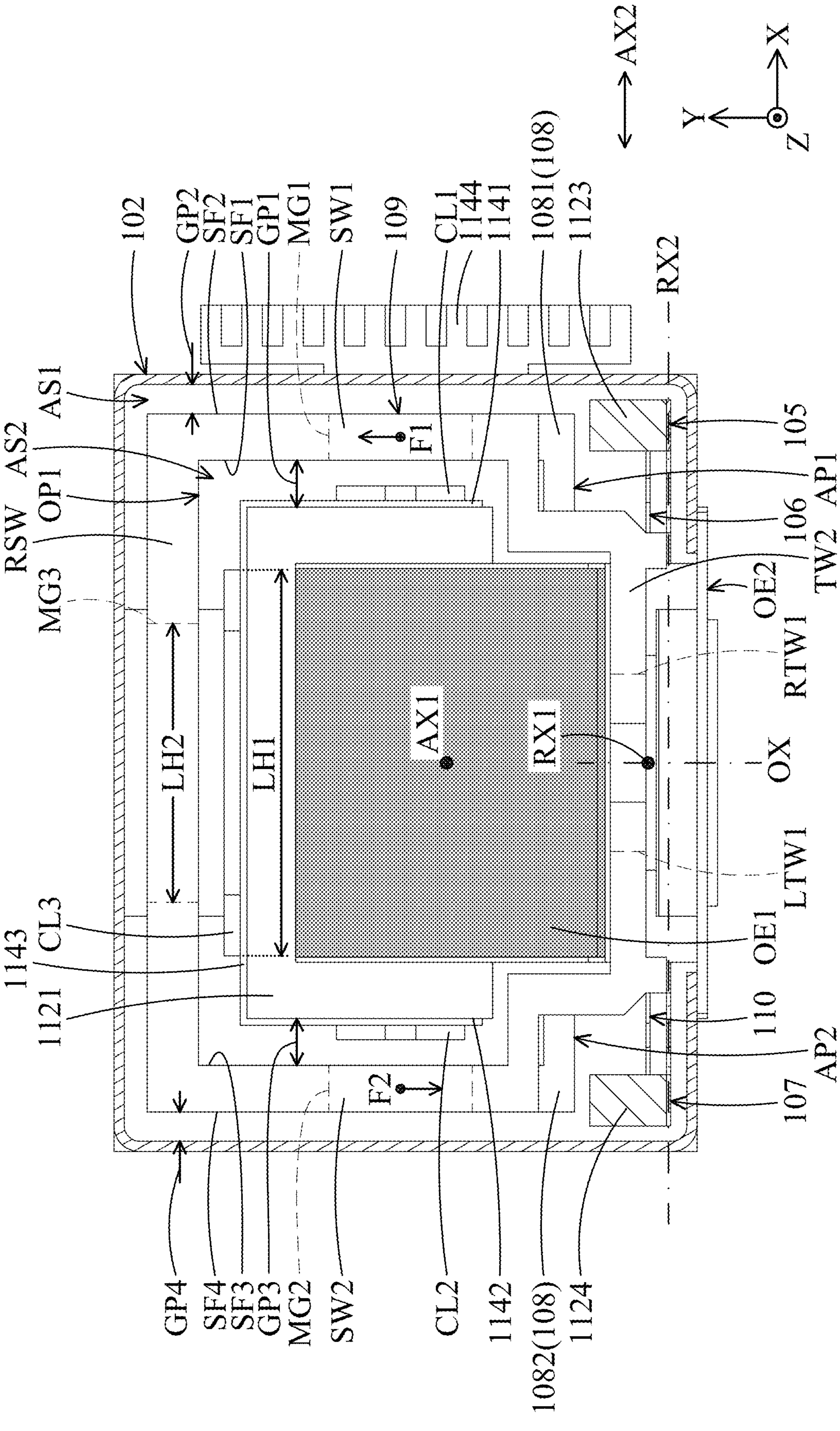
FIG. 4 is a cross-sectional view of the first optical module 100A along line B-B in FIG. 3 according to an embodiment of the present disclosure.
Figure 5:
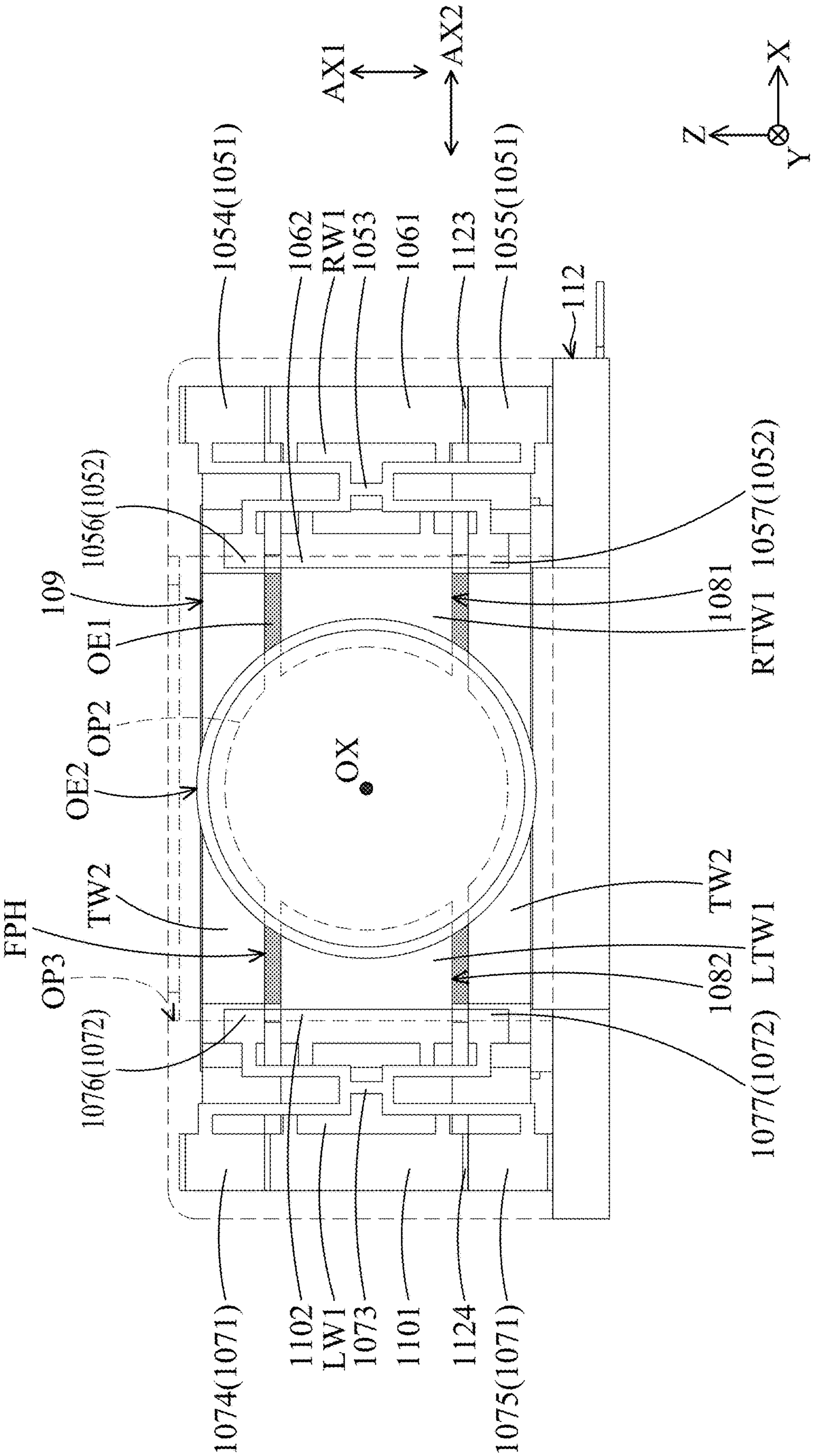
FIG. 5 is a font view of a partial structure of the first optical module 100A according to an embodiment of the present disclosure.

Please refer to FIG. 1 to FIG. 5. FIG. 4 is a cross-sectional view of the first optical module 100A along line B-B in FIG. 3 according to an embodiment of the present disclosure, and FIG. 5 is a font view of a partial structure of the first optical module 100A according to an embodiment of the present disclosure. It should be noted that, in order to clearly represent the internal structure, the outer frame 102 in the some figures is drawn with a dotted line, which does not mean that the outer frame 102 does not exist. The following figures are the same.

As shown in FIG. 2 and FIG. 4, the movable assembly MA may include a second accommodation space AS2 configured to accommodate the first optical element OE1, and the second accommodation space AS2 is located in the first accommodation space AS1.

In this embodiment, the optical axis OX may be defined by the second optical element OE2, and the optical axis OX passes through the second optical element OE2 and the first optical element OE1. As shown in FIG. 2 and FIG. 5, when viewed along the optical axis OX, the movable assembly MA has a long strip-shaped structure.

As shown in FIG. 2 and FIG. 5, the movable assembly MA includes a first movable part 108 and a second movable part 109, and a portion of the first movable part 108 is accommodated in the second movable part 109. When viewed along the optical axis OX, the first movable part 108 overlaps a portion of the second movable part 109.

Furthermore, as shown in FIG. 4, when viewed along the first axis AX1, the first movable part 108 overlaps a portion of the second movable part 109. The first axis AX1 is not parallel to the optical axis OX. For example, the first axis AX1 is perpendicular to the optical axis OX.

As shown in FIG. 2 and FIG. 5, the first movable part 108 includes a first side portion 1081 and a second side portion 1082. When viewed along the optical axis OX, the first side portion 1081 and the second side portion 1082 are separated from each other and located on opposite sides of the first optical element OE1. Furthermore, when viewed along the optical axis OX, the second movable part 109 has a long strip-shaped structure.

In addition, the movable assembly further includes a first opening OP1. The first opening OP1 corresponds to the first optical element OE1. As shown in FIG. 4, when viewed along the first axis AX1, at least a portion of the first optical element OE1 is exposed from the first opening OP1.

As shown in FIG. 2, the first side portion 1081 and the second side portion 1082 respectively have a first right top wall RTW1 and a first left top wall LTW1, corresponding to the second optical element OE2. Similarly, the second movable part 109 has a second top wall TW2 corresponding to the second optical element OE2.

As shown in FIG. 5, when viewed along the optical axis OX, the first left top wall LTW1, the first right top wall RTW1 and the second top wall TW2 form a second opening OP2. The optical axis OX passes through the second opening OP2, and the second opening OP2 is communicated with the first opening OP1. When viewed along the optical axis OX, a portion of the first optical element OE1 may be exposed from the second opening OP2.

Furthermore, the first side portion 1081 and the second side portion 1082 further have a first right side wall RW1 and a first left side wall LW1 respectively. When viewed along the optical axis OX, the first left side wall LW1 and the first right side wall RW1 are located on opposite sides of the first optical element OE1.

In this embodiment, the second movable part 109 may further include a first side wall SW1, a second side wall SW2 and a rear side wall RSW. The rear side wall RSW is connected between the first side wall SW1 and the second side wall SW2, and the second top wall TW2 is connected between the first side wall SW1 and the second side wall SW2.

When viewed along the optical axis OX, the first side wall SW1 and the second side wall SW2 are located on opposite sides of the first optical element OE1, and when viewed along the optical axis OX, the first optical element OE1 is located between the first side wall SW1 and the second side wall SW2.

As shown in FIG. 2, the second top wall TW2, the first side wall SW1, the second side wall SW2 and the rear side wall RSW form the aforementioned first opening OP1. As shown in FIG. 4, when viewed along the first axis AX1, the second movable part 109 surrounds the first optical element OE1.

Furthermore, the second movable part 109 has a front penetrating hole FPH which is formed on the second top wall TW2, and the first left top wall LTW1 and the first right top wall RTW1 are located in the front penetrating hole FPH.

When viewed along the optical axis OX, the first left top wall LTW1 and the first right top wall RTW1 do not overlap the second top wall TW2. In addition, as shown in FIG. 4, when viewed along the first axis AX1, the first left top wall LTW1 and the first right top wall RTW1 overlap the second top wall TW2.

As shown in FIG. 2, the first side wall SW1 and the second side wall SW2 respectively form a first penetrating hole PH1 and a second penetrating hole PH2. A portion of the first right side wall RW1 is located within the first penetrating hole PH1, and a portion of the first left side wall LW1 is located within the second penetrating hole PH2.

When viewed along the first axis AX1, a portion of the first right top wall RTW1 does not overlap the first side wall SW1, and when viewed along the first axis AX1, a portion of the first left top wall LTW1 does not overlap the second side wall SW2.

In addition, the base 112 includes a base plate 1020 having a plate-shaped structure, and the base 112 of the fixed assembly FA further includes a first supporting portion 1121 which is disposed on the base plate 1020 to accommodate and support the first optical element OE1. Specifically, the first optical element OE1 is fixedly connected to the first supporting portion 1121 of the fixed assembly FA.

In this embodiment, the movable assembly MA is movable relative to the first optical element OE1. Furthermore, as shown in FIG. 2 and FIG. 4, a first surface SF1 of the first side wall SW1 faces the first optical element OE1, and a second surface SF2 of the first side wall SW1 and the first surface SF1 face in opposite directions.

As shown in FIG. 4, there is a gap GP1 between the first surface SF1 and the base 112 of the fixed assembly FA, and there is a gap GP2 between the second surface SF2 and the outer frame 102 of the fixed assembly FA.

Similarly, a third surface SF3 of the second side wall SW2 faces the first optical element OE1, and a fourth surface SF4 of the second side wall SW2 and the third surface SF3 face in opposite directions.

There is a gap GP3 between the third surface SF3 and the base 112 of the fixed assembly FA, there is a gap GP4 between the fourth surface SF4 and the outer frame 102 of the fixed assembly FA, and the third surface SF3 faces the first surface SF1. Based on this design, when the movable assembly MA moves relative to the base 112, the movable part 108 does not collide with the base 112.

As shown in FIG. 2, the outer frame 102 of the fixed assembly FA may include a third opening OP3. The third opening OP3 corresponds to the second optical element OE2, and the third opening OP3 also corresponds to the first optical element OE1. As shown in FIG. 5, when viewed along the optical axis OX, the third opening OP3 is larger than the second opening OP2.

In this embodiment, the outer frame 102 has a first outer wall 102FW and a second outer wall 102TW, and the first outer wall 102FW and the second outer wall 102TW each have a plate-shaped structure.

Specifically, the aforementioned third opening OP3 is formed by the first outer wall 102FW and the second outer wall 102TW, and the first outer wall 102FW and the second outer wall 102TW are perpendicular to each other. That is, the third opening OP3 may have an L-shaped structure.

Therefore, as shown in FIG. 3, the aforementioned external light LT is incident on the third opening OP3 in a first direction D1, is reflected by the first optical element OE1, and then is emitted from the third opening OP3 in a second direction D2. The first direction D1 and the second direction D2 are not parallel to each other, for example, they are perpendicular to each other. In addition, the first direction D1 is parallel to the first axis AX1.

Figure 6:
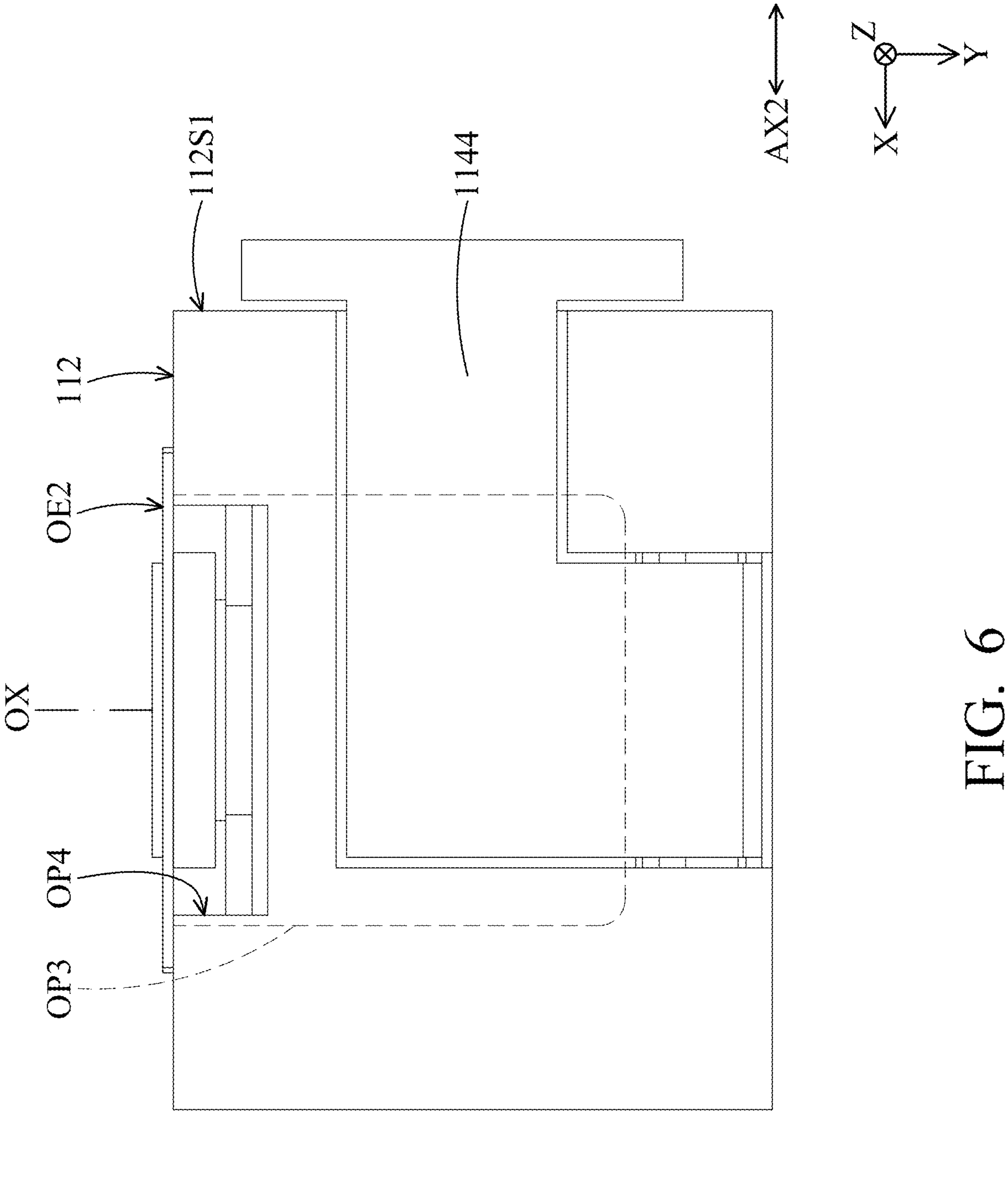
FIG. 6 is a bottom view of the first optical module 100A according to an embodiment of the present disclosure.

Next, please refer to FIG. 4 and FIG. 6. FIG. 6 is a bottom view of the first optical module 100A according to an embodiment of the present disclosure. As shown in FIG. 6, the base 112 of the fixed assembly FA further includes a fourth opening OP4 corresponding to the second optical element OE2.

As shown in FIG. 6, when viewed along the first axis AX1 (the Z-axis), the third opening OP3 overlaps at least portion of the fourth opening OP4, and the fourth opening OP4 is located at the base 112 (that is, formed by base 112).

Figure 7:
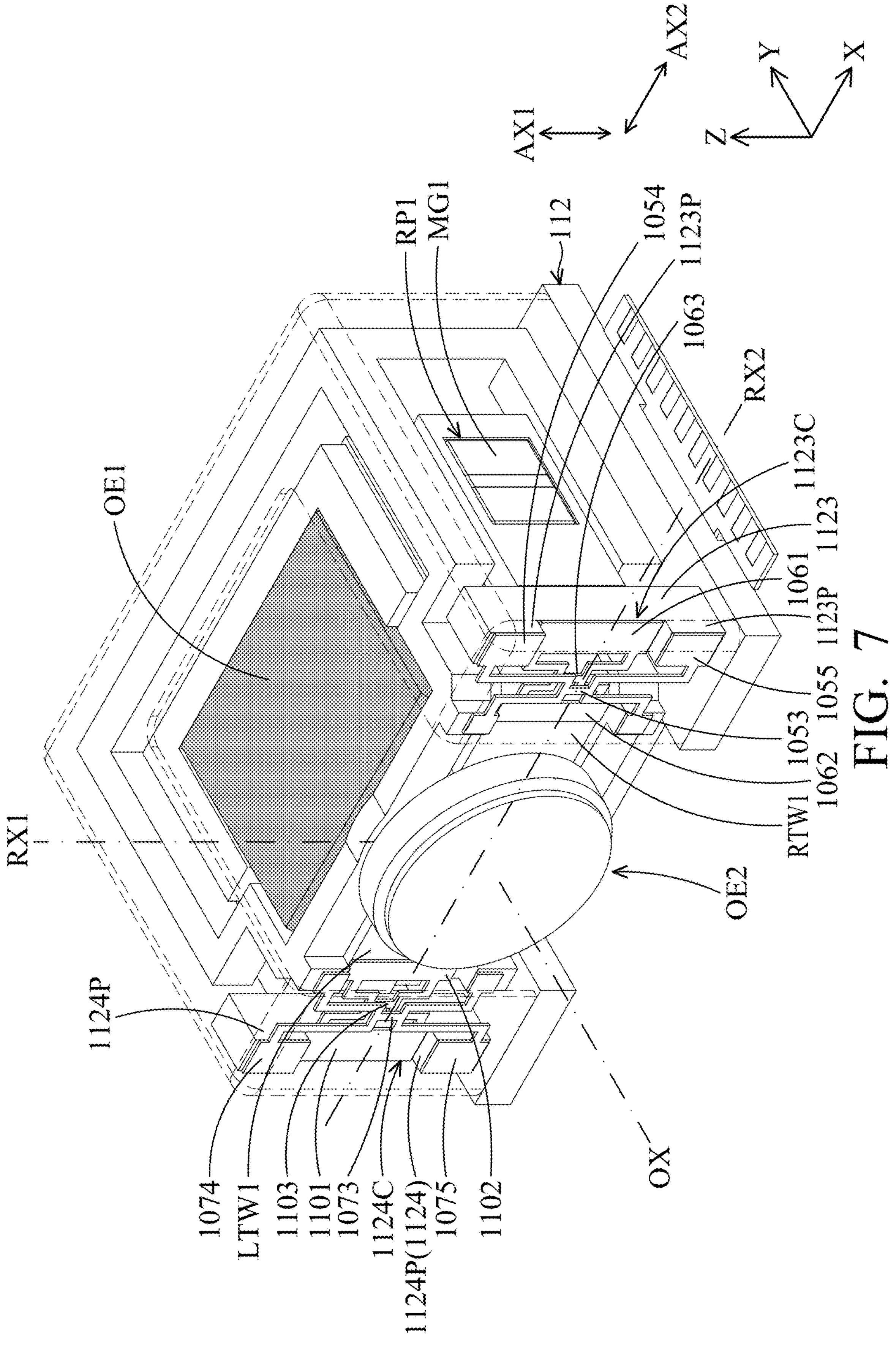
FIG. 7 is a schematic diagram of the first optical module 100A after assembly according to an embodiment of the present disclosure.

Next, please refer to FIG. 2, FIG. 5 and FIG. 7, and FIG. 7 is a schematic diagram of the first optical module 100A after assembly according to an embodiment of the present disclosure. As shown in figures, in this embodiment, the optical element driving mechanism 100 further includes a connecting assembly CA, so that the movable assembly MA is movably connected to the fixed assembly FA through the connecting assembly CA. The connecting assembly CA may include a first elastic member 106 and a second elastic member 110.

Specifically, as shown in FIG. 7, the first elastic member 106 and the second elastic member 110 respectively have a first flexible portion 1063 and a second flexible portion 1103, the first flexible portion 1063 has flexibility, and the second flexible portion 1103 has flexibility.

As shown in FIG. 7, when viewed along the optical axis OX, the first flexible portion 1063, the first optical element OE1, and the second flexible portion 1103 are arranged along a second axis AX2, and the second axis AX2 is not parallel to the first axis AX1 (that is, perpendicular to each other).

When viewed along the optical axis OX, the first flexible portion 1063 and the second flexible portion 1103 are arranged along the second axis AX2. When viewed along the optical axis OX, the center of the second optical element OE2 is located between the first flexible portion 1063 and the second flexible portion 1103.

Furthermore, as shown in FIG. 5 and FIG. 7, the first elastic member 106 further has a first connecting end 1061 which is fixedly connected to the base 112 of the fixed assembly FA. Specifically, the first connecting end 1061 is affixed to a first setting portion 1123 of the fixed assembly FA. The first setting portion 1123 has a first groove 1123C, and the first connecting end 1061 is disposed on the bottom of the first groove 1123C.

Similarly, the first elastic member 106 further has a second connecting end 1062 which is fixedly connected to the first right top wall RTW1 of the first side portion 1081 of the first movable part 108, and the first flexible portion 1063 is connected between the first connecting end 1061 and the second connecting end 1062.

Similarly, the second elastic member 110 may have a third connecting end 1101 which is fixedly connected to the base 112 of the fixed assembly FA. Specifically, the third connecting end 1101 is affixed to a second setting portion 1124 of the fixed assembly FA. The second setting portion 1124 has a second groove 1124C, and the third connecting end 1101 is disposed on the bottom of the second groove 1124C.

The second elastic member 110 further has a fourth connecting end 1102 which is fixedly connected to the first left top wall LTW1 of the second side portion 1082 of the first movable part 108, and the second flexible portion 1103 is connected between the third connecting end 1101 and the fourth connecting end 1102.

As shown in FIG. 2, the first setting portion 1123 and the second setting portion 1124 each have a columnar structure extending from the base plate 1120 of the base 112 along the first axis AX1. As shown in FIG. 5 and FIG. 7, when viewed along the optical axis OX, the first setting portion 1123, the second optical element OE2 and the second setting portion 1124 are arranged along the second axis AX2.

As shown in FIG. 2 and FIG. 5, a first avoidance portion AP1 of the first movable part 108 corresponds to the first setting portion 1123, and a second avoidance portion AP2 of the first movable part 108 corresponds to the second setting portion 1124.

Specifically, the first avoidance portion AP1 has a recessed structure, and the second avoidance portion AP2 has a recessed structure. Based on this design, it can be ensured that the first movable part 108 has enough space for movement.

Furthermore, as shown in FIG. 2 and FIG. 5, in this embodiment, the connecting assembly CA may further include a third elastic element 105 and a fourth elastic element 107. The third elastic element 105 and the fourth elastic element 107 respectively have a third flexible portion 1053 and a fourth flexible portion 1073. Similarly, the third flexible portion 1053 has flexibility, and the fourth flexible portion 1073 has flexibility.

As shown in FIG. 5, when viewed along the optical axis OX, the third flexible portion 1053 and the first optical element OE1 are arranged along the second axis AX2, and when viewed along the optical axis OX, the third flexible portion 1053 and the fourth flexible portion 1073 are arranged along the second axis AX2.

When viewed along the optical axis OX, the center of the second optical element OE2 is located between the third flexible portion 1053 and the fourth flexible portion 1073, such overlapping the optical axis OX. As shown in FIG. 5 and FIG. 7, when viewed along the optical axis OX, the third flexible portion 1053 overlaps a portion of the first flexible portion 1063. Similarly, when viewed along the optical axis OX, the fourth flexible portion 1073 overlaps a portion of the second flexible portion 1103.

It should be noted that, as shown in FIG. 4, when the movable assembly MA is not moving, the first elastic member 106 and the third elastic member 105 are located on different planes. Therefore, when viewed along the first axis AX1 or the second axis AX2, the first elastic member 106 does not overlap the third elastic member 105.

In addition, the first elastic member 106 and the second elastic member 110 may be located on the same plane, and the third elastic member 105 and the fourth elastic member 107 may be located on the same plane. Therefore, when viewed along the first axis AX1 or the second axis AX2, the second elastic member 110 does not overlap the fourth elastic member 107.

As shown in FIG. 5, in this embodiment, the third elastic member 105 further has a fifth connecting end 1051 which is fixedly connected to the fixed assembly FA. Specifically, the fifth connecting end 1051 is affixed to the first setting portion 1123.

In this embodiment, the fifth connecting end 1051 may include a first outer side connecting portion 1054 and a second outer side connecting portion 1055, and the first outer side connecting portion 1054 and the second outer side connecting portion 1055 are fixedly connected to the first setting portion 1123. Specifically, as shown in FIG. 2 and FIG. 7, the first setting portion 1123 has two first protruding portions 1123P, and the first groove 1124C is formed between the two first protruding portions 1123P. The first outer side connecting portion 1054 and the second outer side connecting portion 1055 are respectively disposed on the two first protruding portions 1123P.

It is worth noting that, as shown in FIG. 5, when viewed along the optical axis OX, the fifth connecting end 1051 does not overlap the first connecting end 1061. Specifically, when viewed along the optical axis OX, the first outer side connecting portion 1054 and the second outer side connecting portion 1055 each have a rectangular structure and do not overlap the first connecting end 1061 having a rectangular structure. In addition, as shown in FIG. 7, when viewed along the second axis AX2, the first outer side connecting portion 1054 and the second outer side connecting portion 1055 do not overlap the first connecting end 1061. That is, the first outer side connecting portion 1054 and the second outer side connecting portion 1055 are on a different plane from the first connecting end 1061.

Similarly, the third elastic member 105 further has a sixth connecting end 1052 which is fixedly connected to the second top wall TW2 of the second movable part 109, and the third flexible portion 1053 is connected between the fifth connecting end 1051 and the sixth connecting end 1052.

Specifically, the sixth connecting end 1052 includes a first inner side connecting portion 1056 and a second inner side connecting portion 1057, and the first inner side connecting portion 1056 and the second inner side connecting portion 1057 are fixedly connected to the second top wall TW2 of the second movable part 109.

When viewed along the optical axis OX, the first inner side connecting portion 1056 and the second inner side connecting portion 1057 having a rectangular structure do not overlap the second connecting end 1062 having a rectangular structure.

Similarly, the fourth elastic member 107 further has a seventh connecting end 1071 which is fixedly connected to the fixed assembly FA. Specifically, the seventh connecting end 1071 is affixed to the second setting portion 1124.

In this embodiment, the seventh connecting end 1071 includes a third outer side connecting portion 1074 and a fourth outer side connecting portion 1075, and the third outer side connecting portion 1074 and the fourth outer side connecting portion 1075 are fixedly connected to the second setting portion 1124. Specifically, as shown in FIG. 2 and FIG. 7, the second setting portion 1124 has two second protruding portions 1124P, and the second groove 1124C is formed between the two second protruding portions 1124P. The third outer side connecting portion 1074 and the fourth outer side connecting portion 1075 are respectively disposed on the two second protruding portions 1124P.

When viewed along the optical axis OX, the seventh connecting end 1071 does not overlap the third connecting end 1101. Specifically, when viewed along the optical axis OX, the third outer side connecting portion 1074 and the fourth outer side connecting portion 1075 each have a rectangular structure and do not overlap the third connecting end 1101 having a rectangular structure. In addition, as shown in FIG. 7, when viewed along the second axis AX2, the third outer side connecting portion 1074 and the fourth outer side connecting portion 1075 do not overlap the third connecting end 1101. That is, the third outer side connecting portion 1074 and the fourth outer side connecting portion 1075 are on a different plane from the third connecting end 1101.

Similarly, the fourth elastic member 107 further has an eighth connecting end 1072 which is fixedly connected to the second top wall TW2 of the second movable part 109, and the fourth flexible portion 1073 is connected between the seventh connecting end 1071 and the eighth connecting end 1072.

In this embodiment, the eighth connecting end 1072 includes a third inner side connecting portion 1076 and a fourth inner side connecting portion 1077, and the third inner side connecting portion 1076 and the fourth inner side connecting portion 1077 are fixedly connected to the second top wall TW2 of the second movable part 109.

When viewed along the optical axis OX, the third inner side connecting portion 1076 and the fourth inner side connecting portion 1077 each having a rectangular structure do not overlap the fourth connecting end 1102 having a rectangular structure.

It is worth noting that, as shown in FIG. 5, when viewed along the optical axis OX, the first optical module 100A of the optical element driving mechanism 100 does not include any flexible portion which is arranged with the second optical element OE2 along the first axis AX1 (for example, a flexible portion similar to the first flexible portion 1063). Therefore, such a configuration can significantly reduce the height of the optical element driving mechanism 100 along the Z-axis so as to achieve the purpose of thinning.

In addition, it should be noted that the elastic coefficients of the first elastic member 106 corresponding to the first rotation axis RX1 and the second rotation axis RX2 is between 20 and 30, and the elastic coefficients corresponding to the transverse direction (the second axis AX2) and the longitudinal direction (the first axis AX1) reaches tens of thousands, and the second elastic member 110 can also have the same properties, so that the first movable part 108 does not produce translation or displacement along the first axis AX1 and the second axis AX2 during the movement.

Based on this design, it can be ensured that the first movable part 108 is stably suspended on the base 112 through the first elastic member 106 and the second elastic member 110, and it also increases the stability when the first movable part 108 rotates around the first rotation axis RX1.

Similarly, the elastic coefficients of the third elastic member 105 corresponding to the first rotation axis RX1 and the second rotation axis RX2 are between 20 and 30, and the elastic coefficients corresponding to the transverse direction (the second axis AX2) and the longitudinal direction (the first axis AX1) reach tens of thousands, and the fourth elastic member 107 can also have the same properties, so that the second movable part 109 does not produce translation or displacement along the first axis AX1 and the second axis AX2 during the movement.

Based on this design, it can be ensured that the second movable part 109 is stably suspended on the base 112 through the third elastic member 105 and the fourth elastic member 107, and it also increases the stability when the second movable part 109 rotates around the second rotation axis RX2.

Figure 8:
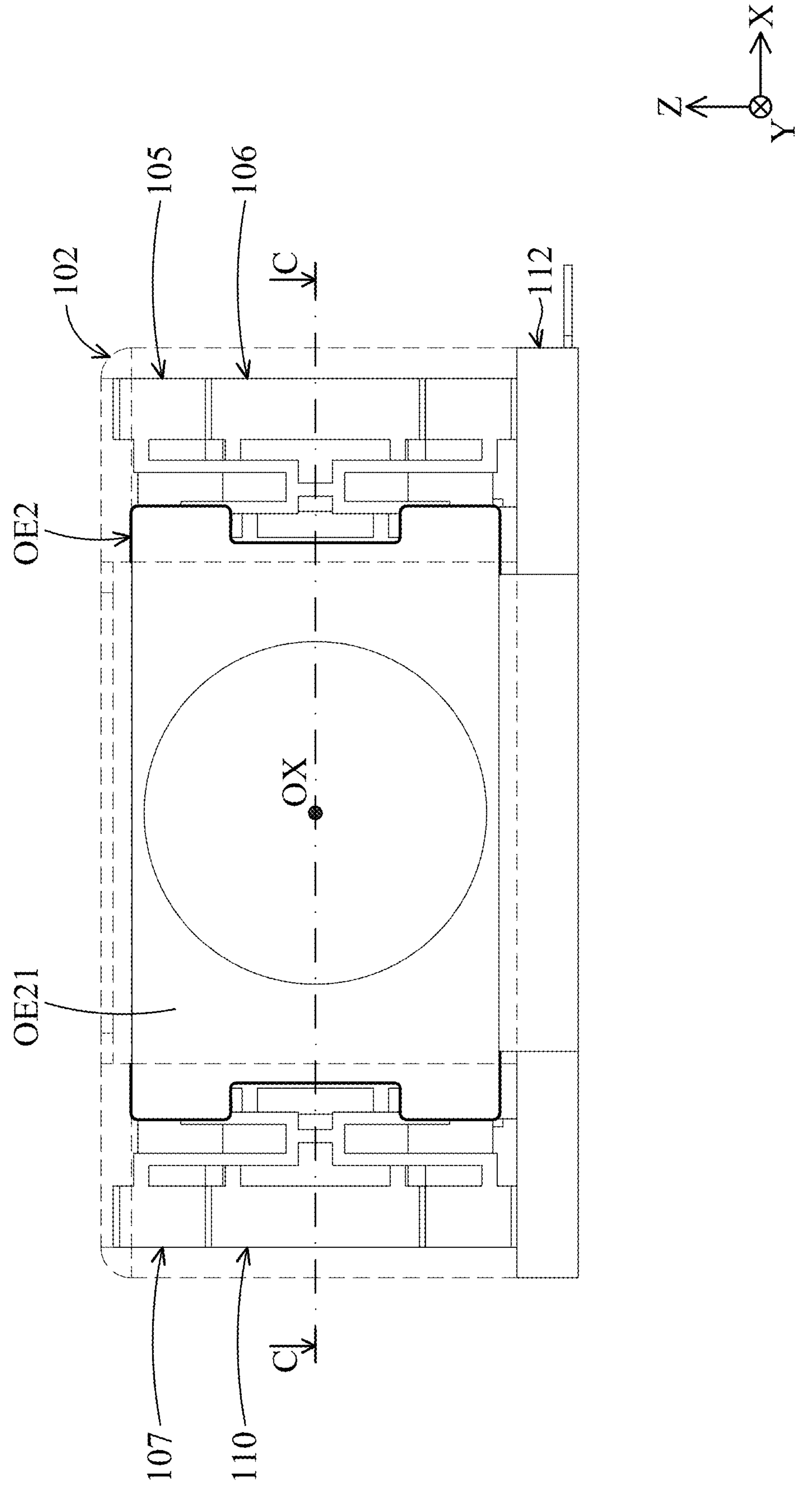
FIG. 8 is a front view of the first optical module 100A according to an embodiment of the present disclosure.
Figure 9:
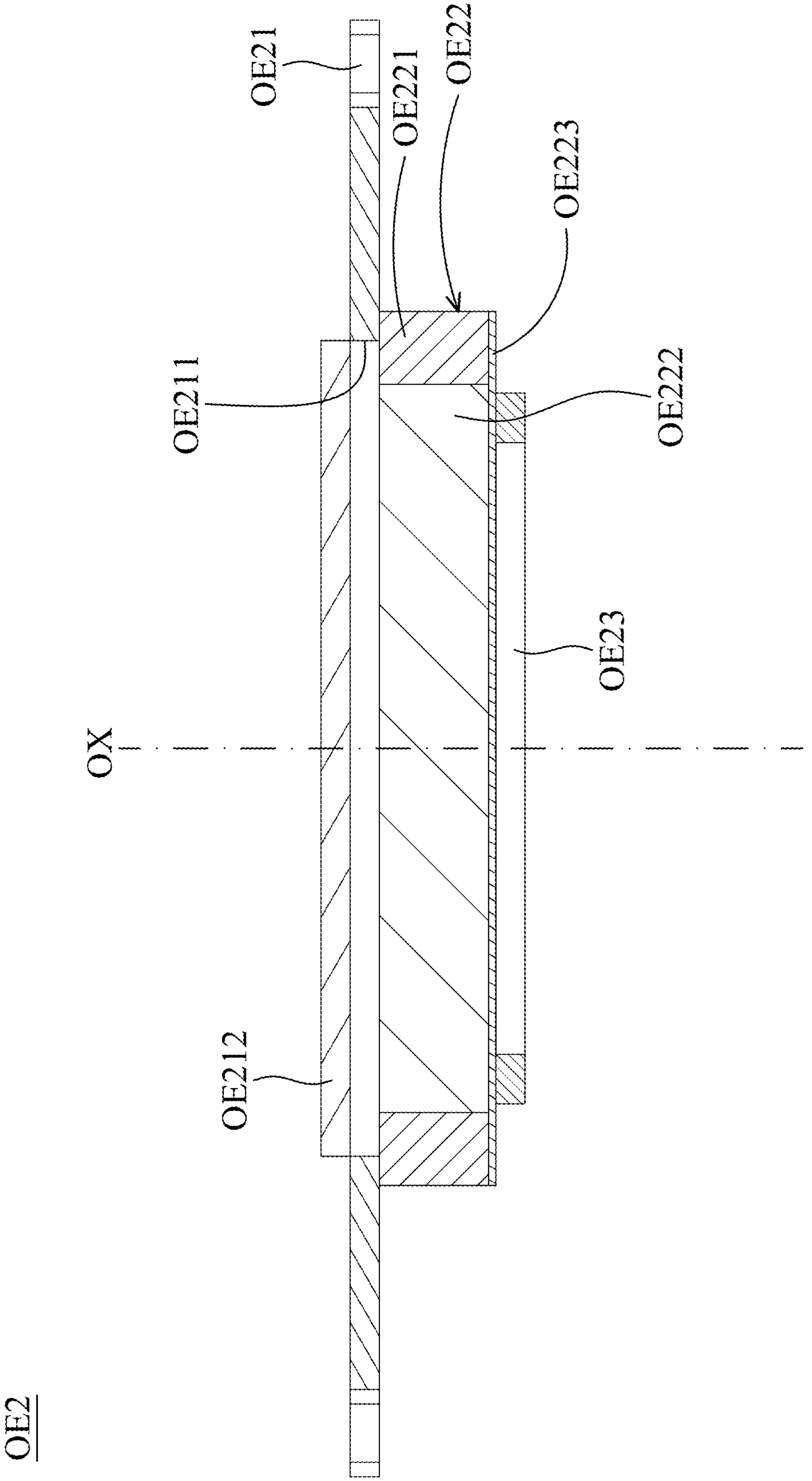
FIG. 9 is a cross-sectional view of the second optical element OE2 along the line C-C in FIG. 8 according to an embodiment of the present disclosure.

Next, please refer to FIG. 8 and FIG. 9. FIG. 8 is a front view of the first optical module 100A according to an embodiment of the present disclosure, and FIG. 9 is a cross-sectional view of the second optical element OE2 along the line C-C in FIG. 8 according to an embodiment of the present disclosure.

In this embodiment, the first optical element OE1 and the second optical element OE2 may be made of different materials. For example, the first optical element OE1 and the second optical element OE2 may be in different material states. Specifically, the second optical element OE2 can be a liquid lens, and the first optical element OE1 can be a solid prism lens, but they are not limited thereto.

In this embodiment, the second optical element OE2 may include an optical fixed portion OE21, a main body OE22 and a pushing portion OE23. As shown in FIG. 8, the optical fixed portion OE21 has a plate-shaped structure which is fixedly connected to the outer frame 102 of the fixed assembly FA. For example, the optical fixed portion OE21 and the outer frame 102 are both made of metal material, so that the optical fixed portion OE21 can be affixed to the outer frame 102 of the fixed assembly FA by laser welding (shown by the bold lines in FIG. 8). It is important to note that the optical fixed portion OE21 is not elastic or flexible.

In addition, as shown in FIG. 8, when viewed along the optical axis OX, the optical fixed portion OE21 overlaps at least portion of the connecting assembly CA. Specifically, the optical fixed portion OE21 overlaps at least portion of the first elastic member 106 and the second elastic member 110, and the optical fixed portion OE21 overlaps a portion of the third elastic member 105 and the fourth elastic member 107.

Furthermore, the optical fixed portion OE21 has an optical opening OE211, so that the aforementioned external light LT can pass through the main body OE22 along the optical axis OX. The optical fixed portion OE21 may further have a translucent element OE212, such as a lens, which is fixedly disposed on the optical fixed portion OE21.

The main body OE22 may have an accommodation frame OE221 to accommodate the liquid OE222 therein, and a thin film OE223 is provided on the bottom of the accommodation frame OE221 to seal the liquid OE222 within the accommodation frame OE221.

Furthermore, the pushing portion OE23 has a ring-shaped structure which is fixedly connected to the movable assembly MA and the thin film OE223 and located between the movable assembly MA and the thin film OE223. The pushing portion OE23 can be driven by the movable assembly MA to push the thin film OE223 and the liquid OE222, so as to change the optical properties of the second optical element OE2.

Figure 10:
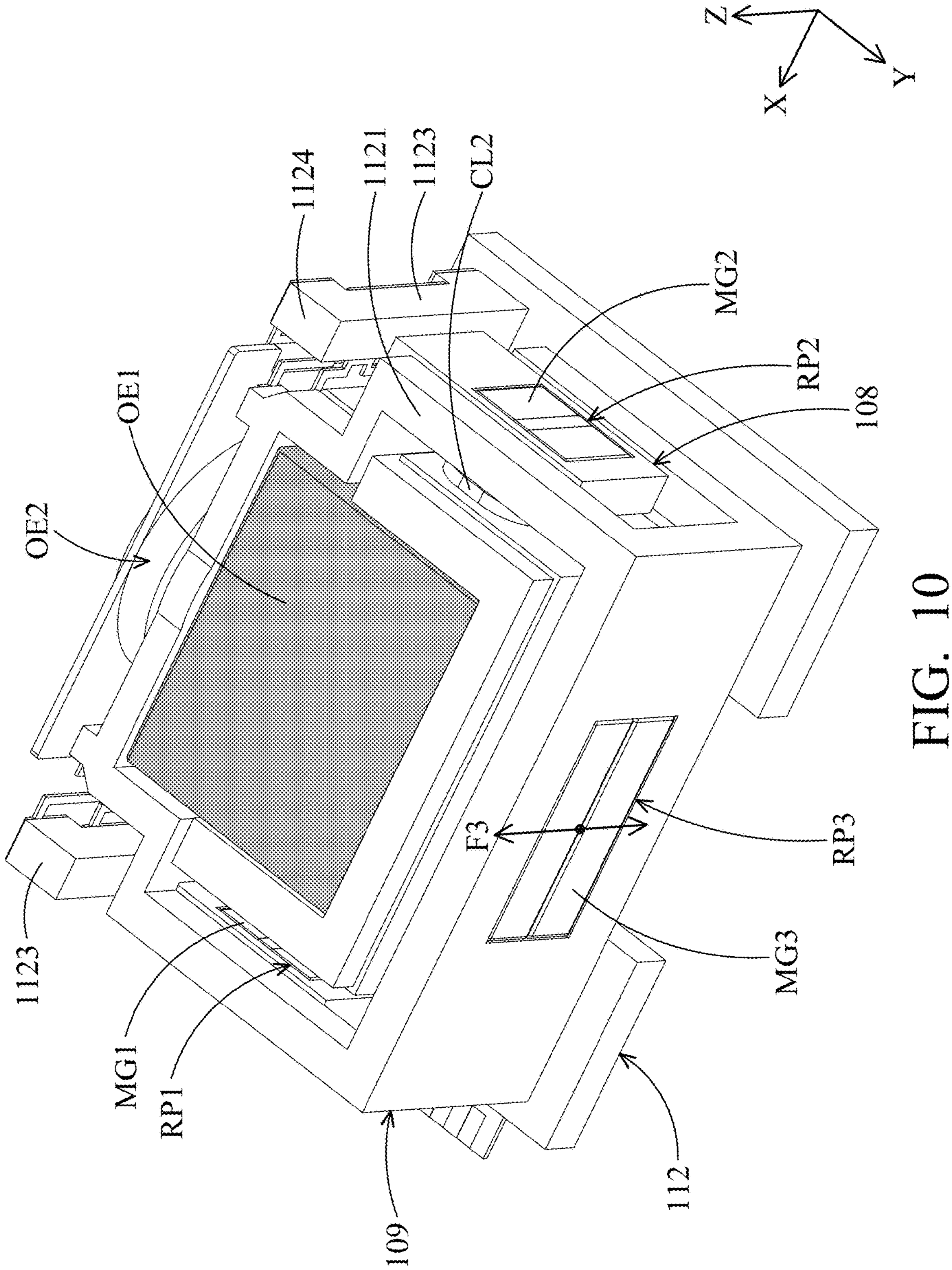
FIG. 10 is a perspective view of a partial structure of the first optical module 100A according to an embodiment of the present disclosure.
Figure 11:
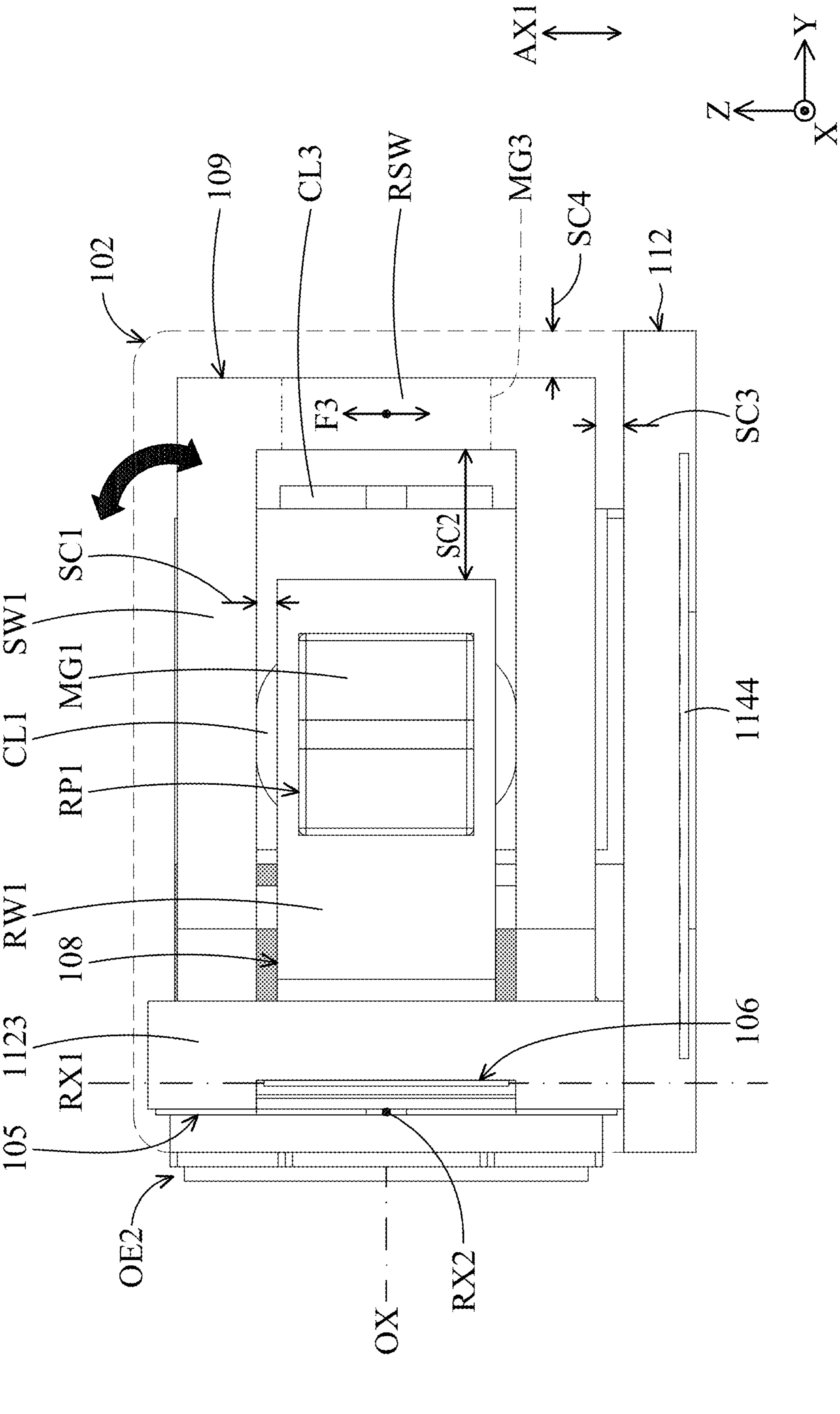
FIG. 11 is a side view of the first optical module 100A according to an embodiment of the present disclosure.

Please refer to FIG. 2, FIG. 4, FIG. 7, FIG. 10 and FIG. 11. FIG. 10 is a perspective view of a partial structure of the first optical module 100A according to an embodiment of the present disclosure, and FIG. 11 is a side view of the first optical module 100A according to an embodiment of the present disclosure. In this embodiment, the first right side wall RW1 and the first left side wall LW1 respectively form a first accommodation hole RP1 and a second accommodation hole RP2.

Correspondingly, the driving assembly DA includes a first driving element MG1 and a second driving element MG2, which are respectively disposed in the first accommodation hole RP1 and the second accommodation hole RP2. In addition, the rear side wall RSW of the second movable part 109 forms a rear penetrating hole RP3, and the driving assembly DA further includes a third driving element MG3 which is disposed in the rear penetrating hole RP3.

As shown in FIG. 11, when viewed along the second axis AX2, a first gap SC1 is formed between the first right side wall RW1 and the first side wall SW1 along the first axis AX1. When viewed along the second axis AX2, a second gap SC2 is formed between the first right side wall RW1 and the rear side wall RSW along the optical axis OX. The second gap SC2 is larger than the first gap SC1.

When viewed along the second axis AX2, a third gap SC3 is formed between the rear side wall RSW and the base 112 along the first axis AX1. When viewed along the second axis AX2, a fourth gap SC4 is formed between the rear side wall RSW and the outer frame 102 along the optical axis OX.

Based on this design, when the movable assembly MA moves relative to the fixed assembly FA, the first movable part 108 is not in contact with the second movable part 109, and the second movable part 109 is not in contact with the outer frame 102 or the base 112.

Furthermore, the driving assembly DA may further include a first coil CL1 and a second coil CL2, respectively corresponding to the first driving element MG1 and the second driving element MG2, and the first optical module 100A of the optical element driving mechanism 100 may further includes a circuit assembly 114 which is fixedly disposed on the base 112 of the fixed assembly FA.

The circuit assembly 114 is, for example, a flexible circuit board (FPC board) which may include a first circuit portion 1141 and a second circuit portion 1142, and the first coil CL1 and the second coil CL2 are respectively fixedly disposed on the first circuit portion 1141 and the second circuit portion 1142.

Furthermore, the driving assembly DA further includes a third coil CL3, corresponding to the third driving element MG3. The first driving element MG1 to the third driving element MG3 are magnets, but they are not limited thereto.

The circuit assembly 114 further includes a third circuit portion 1143 which is connected between the first circuit portion 1141 and the second circuit portion 1142, and the third coil CL3 is fixedly disposed on the third circuit portion 1143. The circuit assembly 114 further includes a fourth circuit portion 1144 which is fixedly disposed on the base 112 and is electrically connected to an external control circuit. The external control circuit is, for example, a control chip of a smartphone, but it is not limited thereto.

As shown in FIG. 4, the first circuit portion 1141 to the third circuit portion 1143 are fixedly disposed on the first supporting portion 1121 of the base 112. When viewed along the first axis AX1, the first coil CL1 is located between the first supporting portion 1121 and the movable assembly MA (such as the second movable part 109). When viewed along the first axis AX1, the second coil CL2 is located between the first supporting portion 1121 and the movable assembly MA (such as the second movable part 109).

Similarly, when viewed along the first axis AX1, the third coil CL3 is located between the first supporting portion 1121 and the movable assembly MA. When viewed along the first axis AX1, the length LH1 of the third coil CL3 along the second axis AX2 is greater than the length LH2 of the third driving element MG3 along the second axis AX2.

When the first driving element MG1 and the second driving element MG2 respectively act with the first coil CL1 and the second coil CL2 to generate the electromagnetic driving forces F1 and F2 respectively (FIG. 4), the first driving element MG1 and the second driving element MG2 are configured to drive the first movable part 108 to rotate around a first rotation axis RX1 (counterclockwise), so that the pushing portion OE23 pushes the main body OE22 to change the optical properties of the second optical element OE2.

As shown in FIG. 7, when viewed along the optical axis OX, the first rotation axis RX1 is located between the first flexible portion 1063 and the second flexible portion 1103. Furthermore, when the first movable part 108 rotates around the first rotation axis RX1, due to the design of the aforementioned second gap SC2, the first movable part 108 is not in contact with the second movable part 109.

In addition, it should be noted that the electromagnetic driving forces F1 and F2 in FIG. 4 can have opposite directions. That is, when viewed along the first axis AX1, the electromagnetic driving forces F1 and F2 can drive the first movable part 108 to rotate clockwise around the first rotation axis RX1.

Similarly, when the third driving element MG3 acts with the third coil CL3 to generate an electromagnetic driving force F3, the third driving element MG3 is configured to drive the second movable part 109 to rotate around a second rotation axis RX2, so that the pushing portion OE23 pushes the main body OE22 to change the optical properties of the second optical element OE2.

Due to the design of the first gap SC1 and the third gap SC3, when the second movable part 109 rotates around the second rotation axis RX2, the second movable part 109 is not in contact with the first movable part 108 and the outer frame 102. In addition, as shown in FIG. 7, when viewed along the optical axis OX, the second rotation axis RX2 passes through the third flexible portion 1053 and the fourth flexible portion 1073.

In this embodiment, as shown in FIG. 4 and FIG. 7, the second rotation axis RX2 is not parallel to the first rotation axis RX1. For example, the second rotation axis RX2 is perpendicular to the first rotation axis RX1. It is worth noting that the first rotation axis RX1 does not intersect with the second rotation axis RX2. In addition, as shown in FIG. 4 and FIG. 7, when viewed along the optical axis OX, the first rotation axis RX1 can intersect with the optical axis OX.

It is worth explaining that in order to achieve the above driving method, as shown in FIG. 2, the North-pole NP1 and South-pole SP1 of the first driving element MG1 are arranged along the optical axis OX, and the North-pole NP2 and South-pole SP2 of the second driving element MG2 are arranged along the optical axis OX, while the North-pole NP3 and South-pole SP3 of the third driving element MG3 are arranged along the first axis AX1.

The present disclosure provides an optical element driving mechanism 100, which can be a periscope lens mechanism, including a fixed assembly FA, a driving assembly DA, a movable assembly MA and a connecting assembly CA. The movable assembly MA is movably connected to the base 112 of the fixed assembly FA through the connecting assembly CA, and the movable assembly MA surrounds the first optical element OE1. The optical fixed portion OE21 of the second optical element OE2 is affixed to the outer frame 102 of the fixed assembly FA, and the pushing portion OE23 is fixedly connected to the movable assembly MA.

The driving assembly DA is configured to drive the movable assembly MA to move relative to the base 112 and the first optical element OE1 to drive the pushing portion OE23 to push the thin film OE223 and the liquid OE222, thereby changing the optical properties of the second optical element OE2, so as to achieve the purpose of optical image stabilization and macro photography. Because there is a gap between the movable assembly MA and the base 112, the movable assembly MA does not collide with the base 112 and cause damage when rotating.

It is worth noting that the movable assembly MA can include the first movable part and the second movable part. The first movable part 108 is suspended on the base 112 through the first elastic member 106 and the second elastic member 110, and the second movable part 109 is suspended on the base 112 through the third elastic member 105 and the fourth elastic member 107. The first movable part 108 and the second movable part 109 can rotate individually or cooperatively. Based on this design, the control accuracy of the optical properties of the second optical element OE2 can be improved.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism for accommodating a first optical element and comprising:

a fixed assembly:

a movable assembly, configured to be connected to a second optical element, wherein the second optical element corresponds to the first optical element, and the movable assembly is movable relative to the fixed assembly;

a connecting assembly, including a first elastic member and a second elastic member, wherein the first elastic member and the second elastic member respectively have a first flexible portion and a second flexible portion, and the movable assembly is movably connected to the fixed assembly through the connecting assembly; and a driving assembly, configured to drive the movable assembly to move relative to the fixed assembly, wherein the fixed assembly includes a first accommodation space configured to accommodate the first optical element, wherein the movable assembly includes a second accommodation space configured to accommodate the first optical element, and wherein the second accommodation space is located in the first accommodation space;

wherein the first elastic member has a first connecting end which is fixedly connected to the fixed assembly:

wherein the first connecting end is affixed to a first setting portion of the fixed assembly;

wherein the first elastic member further has a second connecting end which is fixedly connected to the first movable part;

wherein the first flexible portion is connected between the first connecting end and the second connecting end;

wherein the second elastic member has a third connecting end which is fixedly connected to the fixed assembly:

wherein the third connecting end is affixed to a second setting portion of the fixed assembly;

wherein the second elastic member further has a fourth connecting end which is fixedly connected to the first movable part;

wherein the second flexible portion is connected between the third connecting end and the fourth connecting end.

2. The optical element driving mechanism as claimed in claim 1, wherein:

the second optical element defines an optical axis;

the optical axis passes through the second optical element and the first optical element;

the movable assembly includes a first movable part and a second movable part;

a portion of the first movable part is accommodated in the second movable part;

when viewed along the optical axis, the first movable part overlaps a portion of the second movable part;

when viewed along a first axis, the first movable part overlaps a portion of the second movable part;

the first axis is not parallel to the optical axis;

the first movable part includes a first side portion and a second side portion;

when viewed along the optical axis, the first side portion and the second side portion are separated from each other and located on opposite sides of the first optical element; and when viewed along the optical axis, the second movable part has a long strip-shaped structure.

3. The optical element driving mechanism as claimed in claim 2, wherein the movable assembly further includes a first opening;

the first opening corresponds to the first optical element;

when viewed along the first axis, at least a portion of the first optical element is exposed from the first opening;

the first side portion and the second side portion respectively have a first right top wall and a first left top wall, corresponding to the second optical element;

the second movable part has a second top wall corresponding to the second optical element;

when viewed along the optical axis, the first left top wall, the first right top wall and the second top wall form a second opening;

the optical axis passes through the second opening;

when viewed along the optical axis, a portion of the first optical element is exposed from the second opening.

4. The optical element driving mechanism as claimed in claim 3, wherein the first side portion and the second side portion further have a first right side wall and a first left side wall respectively;

when viewed along the optical axis, the first left side wall and the first right side wall are located on opposite sides of the first optical element;

the second movable part further includes a first side wall, a second side wall and a rear side wall;

the rear side wall is connected between the first side wall and the second side wall;

the second top wall is connected between the first side wall and the second side wall.

5. The optical element driving mechanism as claimed in claim 4, wherein when viewed along the optical axis, the first side wall and the second side wall are located on opposite sides of the first optical element;

when viewed along the optical axis, the first optical element is located between the first side wall and the second side wall;

the second top wall, the first side wall, the second side wall and the rear side wall form the aforementioned first opening;

when viewed along the first axis, the second movable part surrounds the first optical element.

6. The optical element driving mechanism as claimed in claim 5, wherein the second movable part has a front penetrating hole which is formed on the second top wall;

the first left top wall and the first right top wall are located within the front penetrating hole;

when viewed along the optical axis, the first left top wall and the first right top wall do not overlap the second top wall;

when viewed along the first axis, the first left top wall and the first right top wall overlap the second top wall;

the first side wall and the second side wall respectively form a first penetrating hole and a second penetrating hole;

a portion of the first right side wall is located within the first penetrating hole, and a portion of the first left side wall is located within the second penetrating hole;

when viewed along the first axis, a portion of the first right top wall does not overlap the first side wall;

when viewed along the first axis, a portion of the first left top wall does not overlap the second side wall.

7. The optical element driving mechanism as claimed in claim 6, wherein the fixed assembly further includes a base and an outer frame;

the base includes a base plate having a plate-shaped structure;

the outer frame is fixedly connected to the base and forms the first accommodation space;

the fixed assembly further includes a first supporting portion which is disposed on the base plate to accommodate the first optical element;

the first optical element is fixedly connected to the first supporting portion of the fixed assembly;

the movable assembly is movable relative to the first optical element;

a first surface of the first side wall faces the first optical element;

a second surface of the first side wall and the first surface face in opposite directions;

there is a first space between the first surface and the fixed assembly;

there is second space between the second surface and the fixed assembly;

a third surface of the second side wall faces the first optical element;

a fourth surface of the second side wall and the third surface face in opposite directions;

there is third space between the third surface and the fixed assembly;

there is fourth space between the fourth surface and the fixed assembly;

the third surface faces the first surface.

8. The optical element driving mechanism as claimed in claim 7, wherein the fixed assembly further includes a third opening;

the third opening corresponds to the second optical element;

the third opening corresponds to the first optical element;

when viewed along the optical axis, the third opening is larger than the second opening;

the outer frame has a first outer wall and a second outer wall;

the first outer wall and the second outer wall each have a plate-shaped structure;

the third opening is formed by the first outer wall and the second outer wall;

the first outer wall and the second outer wall are perpendicular to each other;

an external light is incident on the third opening in a first direction and is emitted in a second direction from the third opening;

the first direction is not parallel to the second direction;

the first direction is parallel to the first axis;

the fixed assembly further includes a fourth opening corresponding to the second optical element;

when viewed along the first axis, the third opening overlaps at least a portion of the fourth opening;

the fourth opening is located at the base.

9. The optical element driving mechanism as claimed in claim 8, wherein the first flexible portion has flexibility;

the second flexible portion has flexibility;

when viewed along the optical axis, the first flexible portion and the first optical element are arranged along a second axis;

the second axis is not parallel to the first axis;

when viewed along the optical axis, the first flexible portion and the second flexible portion are arranged along the second axis;

when viewed along the optical axis, a center of the second optical element is located between the first flexible portion and the second flexible portion.

10. The optical element driving mechanism as claimed in claim 9, wherein when viewed along the optical axis, the first setting portion, the second optical element and the second setting portion are arranged along the second axis;

the first setting portion and the second setting portion each have a columnar structure extending along the first axis from the base plate of the base;

a first avoidance portion of the first movable part corresponds to the first setting portion;

a second avoidance portion of the first movable part corresponds to the second setting portion;

the first avoidance portion and the second avoidance portion have recessed structures.

11. The optical element driving mechanism as claimed in claim 10, wherein the connecting assembly further includes a third elastic member and a fourth elastic member;

the third elastic member and the fourth elastic member respectively have a third flexible portion and a fourth flexible portion;

the third flexible portion is flexible;

the fourth flexible portion is flexible;

when viewed along the optical axis, the third flexible portion and the first optical element are arranged along the second axis;

when viewed along the optical axis, the third flexible portion and the fourth flexible portion are arranged along the second axis;

when viewed along the optical axis, a center of the second optical element is located between the third flexible portion and the fourth flexible portion;

when viewed along the optical axis, the third flexible portion overlaps a portion of the first flexible portion;

when viewed along the optical axis, the fourth flexible portion overlaps a portion of the second flexible portion;

when viewed along the second axis, the first elastic member does not overlap the third elastic member;

when viewed along the second axis, the second elastic member does not overlap the fourth elastic member.

12. The optical element driving mechanism as claimed in claim 11, wherein the third elastic member has a fifth connecting end which is fixedly connected to the fixed assembly;

the fifth connecting end is affixed to the first setting portion;

the third elastic member further has a sixth connecting end which is fixedly connected to the second movable part;

the third flexible portion is connected between the fifth connecting end and the sixth connecting end;

the fourth elastic member further has a seventh connecting end which is fixedly connected to the fixed assembly;

the seventh connecting end is affixed to the second setting portion;

the fourth elastic member further has an eighth connecting end which is fixedly connected to the second movable part;

the fourth flexible portion is connected between the seventh connecting end and the eighth connecting end;

when viewed along the optical axis, the fifth connecting end does not overlap the first connecting end;

when viewed along the optical axis, the seventh connecting end does not overlap the third connecting end;

when viewed along the optical axis, the optical element driving mechanism does not include any flexible portion arranged with the second optical element along the first axis.

13. The optical element driving mechanism as claimed in claim 12, wherein the fifth connecting end includes a first outer side connecting portion and a second outer side connecting portion;

the first outer side connecting portion and the second outer side connecting portion are fixedly connected to the first setting portion;

when viewed along the optical axis, the first outer side connecting portion and the second outer side connecting portion do not overlap the first connecting end;

the sixth connecting end includes a first inner side connecting portion and a second inner side connecting portion;

the first inner side connecting portion and the second inner side connecting portion are fixedly connected to the second movable part;

when viewed along the optical axis, the first inner side connecting portion and the second inner side connecting portion do not overlap the second connecting end.

14. The optical element driving mechanism as claimed in claim 13, wherein the seventh connecting end includes a third outer side connecting portion and a fourth outer side connecting portion;

the third outer side connecting portion and the fourth outer side connecting portion are fixedly connected to the second setting portion;

when viewed along the optical axis, the third outer side connecting portion and the fourth outer side connecting portion do not overlap the third connecting end;

the eighth connecting end includes a third inner side connecting portion and a fourth inner side connecting portion;

the third inner side connecting portion and the fourth inner side connecting portion are fixedly connected to the second movable part;

when viewed along the optical axis, the third inner side connecting portion and the fourth inner side connecting portion do not overlap the fourth connecting end.

15. The optical element driving mechanism as claimed in claim 14, wherein the first optical element and the second optical element have different materials;

the first optical element and the second optical element have different material states;

the second optical element is a liquid lens;

the first optical element includes a solid lens;

the second optical element includes an optical fixed portion, a main body and a pushing portion;

the optical fixed portion is fixedly connected to the fixed assembly;

the optical fixed portion is affixed to the fixed assembly by laser welding;

the optical axis passes through the main body;

the pushing portion is fixedly connected to the movable assembly;

the pushing portion has a ring-shaped structure;

when viewed along the optical axis, the optical fixed portion overlaps at least a portion of the connecting assembly.

16. The optical element driving mechanism as claimed in claim 15, wherein the first right side wall and the first left side wall respectively form a first accommodation hole and a second accommodation hole;

the driving assembly includes a first driving element and a second driving element, which are respectively disposed in the first accommodation hole and the second accommodation hole;

the first driving element and the second driving element are configured to drive the first movable part to rotate around a first rotation axis, so that the pushing portion pushes the main body to change the optical properties of the second optical element;

when viewed along the optical axis, the first rotation axis is located between the first flexible portion and the second flexible portion;

when viewed along the second axis, a first gap is formed between the first right side wall and the first side wall along the first axis;

when viewed along the second axis, a second gap is formed between the first right side wall and the rear side wall along the optical axis;

the second gap is larger than the first gap;

when the first movable part rotates around the first rotation axis, the first movable part is not in contact with the second movable part;

when viewed along the second axis, a third gap is formed between the rear side wall and the base along the first axis;

when viewed along the second axis, a fourth gap is formed between the rear side wall and the outer frame along the optical axis;

a rear penetrating hole is formed on the rear side wall.

17. The optical element driving mechanism as claimed in claim 16, wherein the driving assembly further includes a third driving element disposed in the rear penetrating hole;

the third driving element is configured to drive the second movable part to rotate around a second rotation axis, so that the pushing portion pushes the main body to change the optical properties of the second optical element;

when the second movable part rotates around the second rotation axis, the second movable part is not in contact with the first movable part;

when viewed along the optical axis, the second rotation axis passes through the third flexible portion and the fourth flexible portion;

the second rotation axis is not parallel to the first rotation axis;

the second rotation axis is perpendicular to the first rotation axis;

the first rotation axis does not intersect with the second rotation axis;

when viewed along the optical axis, the first rotation axis intersects with the optical axis;

North-pole and South-pole of each of the first driving element and the second driving element are arranged along the optical axis;

North-pole and South-pole of the third driving element are arranged along the first axis.

18. The optical element driving mechanism as claimed in claim 17, wherein the driving assembly further includes a first coil and a second coil, respectively corresponding to the first driving element and the second driving element;

the optical element driving mechanism further includes a circuit assembly which is fixedly disposed on the base of the fixed assembly;

the circuit assembly includes a first circuit portion and a second circuit portion;

the first coil and the second coil are respectively fixedly disposed on the first circuit portion and the second circuit portion;

the driving assembly further includes a third coil corresponding to the third driving element;

the circuit assembly further includes a third circuit portion which is connected between the first circuit portion and the second circuit portion;

the third coil is fixedly disposed on the third circuit portion;

the first circuit portion to the third circuit portion are fixedly disposed on the first supporting portion of the base.

19. The optical element driving mechanism as claimed in claim 18, wherein when viewed along the first axis, the first coil is located between the first supporting portion and the movable assembly;

when viewed along the first axis, the second coil is located between the first supporting portion and the movable assembly;

when viewed along the first axis, the third coil is located between the first supporting portion and the movable assembly;

when viewed along the first axis, a length of the third coil along the second axis is greater than a length of the third driving element along the second axis.

* * * * *